(12) United States Patent
Breslau et al.

(10) Patent No.: US 8,306,043 B2
(45) Date of Patent: *Nov. 6, 2012

(54) METHOD AND SYSTEM OF MONITORING THE RECEIPT OF MULTICAST TRAFFIC

(75) Inventors: Lee Breslau, Basking Ridge, NJ (US); William Fenner, Woodside, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 280 days.

This patent is subject to a terminal disclaimer.

(21) Appl. No.: 12/784,878

(22) Filed: May 21, 2010

(65) Prior Publication Data
US 2010/0226277 A1    Sep. 9, 2010

Related U.S. Application Data

(63) Continuation of application No. 11/649,577, filed on Jan. 4, 2007, now Pat. No. 7,729,245, which is a continuation of application No. 11/301,428, filed on Dec. 13, 2005, now Pat. No. 7,180,856.

(51) Int. Cl.
*H04L 12/28* (2006.01)
(52) U.S. Cl. ......................... 370/401; 370/392; 370/230
(58) Field of Classification Search .......... 370/229–235, 370/237, 238, 248, 252, 253, 256, 254, 251, 370/401, 402, 406, 408
See application file for complete search history.

(56) References Cited

U.S. PATENT DOCUMENTS

| | | | |
|---|---|---|---|
| 6,138,144 A | 10/2000 | DeSimone et al. | |
| 6,151,633 A | 11/2000 | Hurst et al. | |
| 6,181,697 B1 | 1/2001 | Nurenberg et al. | |
| 6,321,270 B1 | 11/2001 | Crawley | |
| 6,389,027 B1 | 5/2002 | Lee et al. | |
| 6,490,285 B2 | 12/2002 | Lee et al. | |
| 6,501,763 B1 | 12/2002 | Bhagavath et al. | |
| 6,567,929 B1 | 5/2003 | Bhagavath et al. | |
| 6,600,743 B1 | 7/2003 | Lee et al. | |
| 6,732,182 B1 | 5/2004 | Beverly | |
| 6,970,429 B2 | 11/2005 | Arsikere et al. | |
| 7,035,217 B1 | 4/2006 | Vicisano et al. | |
| 7,102,998 B1 | 9/2006 | Golestani | |
| 7,180,856 B1 * | 2/2007 | Breslau et al. | 370/230 |
| 7,725,925 B2 * | 5/2010 | Liu et al. | 726/3 |
| 2002/0075871 A1 | 6/2002 | Blanc et al. | |
| 2004/0078624 A1 | 4/2004 | Maxemchuk et al. | |
| 2004/0170176 A1 | 9/2004 | Kadambi et al. | |
| 2005/0141501 A1 | 6/2005 | Kadambi et al. | |
| 2005/0190695 A1 | 9/2005 | Phaal | |
| 2005/0190765 A1 | 9/2005 | Gotoh et al. | |
| 2005/0201302 A1 * | 9/2005 | Gaddis et al. | 370/254 |
| 2008/0137540 A1 * | 6/2008 | Botvich | 370/241 |

* cited by examiner

*Primary Examiner* — Brenda H Pham
(74) *Attorney, Agent, or Firm* — Hoffman & Baron, LLP

(57) ABSTRACT

A method and system for monitoring data packet traffic in a multicast network comprising determining a first packet count received at a receiver router, representing a quantity of data packets associated with a multicast group and source at a first time, determining a second packet count received at that receiver router representing a quantity of data packets associated with that multicast group and source, at a second time subsequent to the first time, comparing the second packet count to the first packet count, and indicating an alarm in response to the second packet count being less than a predetermined value greater than the first packet count. A status for multiple routers can be obtained, comprising a difference between the quantity of the first and second packet counts; and indicating a warning in response to at least one of the plurality of router status being less than the predetermined value.

16 Claims, 6 Drawing Sheets

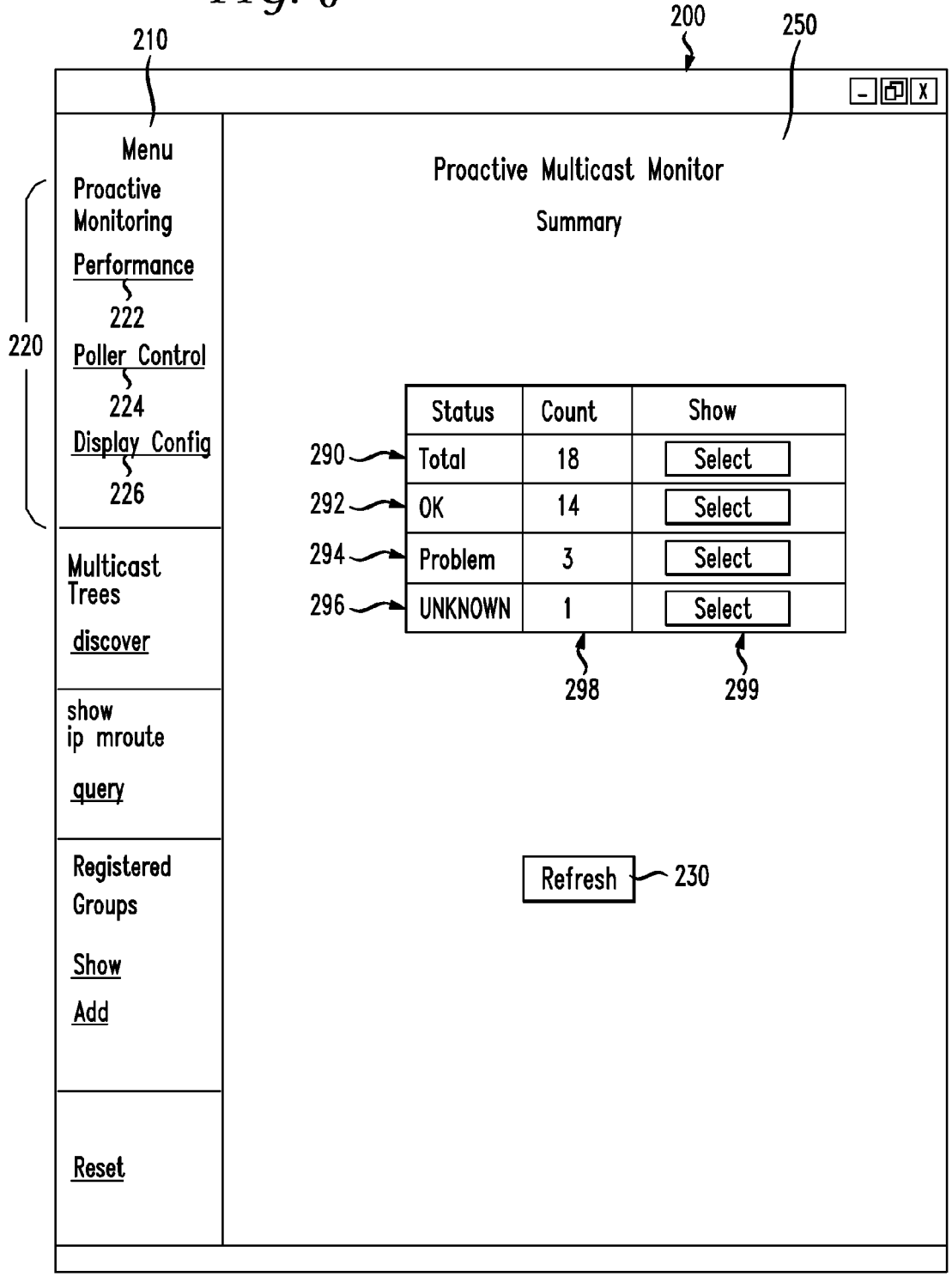

METHOD AND SYSTEM OF MONITORING THE RECEIPT OF MULTICAST TRAFFIC

CROSS-REFERENCE TO RELATED APPLICATION

This application is a continuation of U.S. application Ser. No. 11/649,577 filed Jan. 4, 2007 that will issued as U.S. Pat. No. 7,729,245 on Jun. 1, 2010, which is a continuation of U.S. application Ser. No. 11/301,428 filed Dec. 13, 2005 that issued as U.S. Pat. No. 7,180,856 on May 18, 2007, both of which are incorporated herein by reference.

BACKGROUND OF THE INVENTION

1. Field of the Invention

The present invention generally relates to the field of data transmission systems for digital communications and more particularly to the verification, optimization and/or management of multicast data transmissions over a network.

2. Brief Description of the Related Art

Internet Protocol (IP) multicasting provides a useful way for a source to transmit a stream of data to a group of recipients. Traditional network computing applications transmit data employing a unicast design. Unicast communications send one copy of each data packet to each intended recipient. However, unicast presents scaling problems, when the group of recipients is large. In unicast, the network must carry multiple copies of the same data, thus requiring additional bandwidth for data transmission. In contrast, IP multicasting (also referred to simply as "multicasting") transmits only one copy of the data packets and allows multicast enabled routers to do the work required to deliver that packet to each intended recipient. Further information on multicasting is provided in U.S. Pat. No. 6,501,763, which is incorporated herein by reference.

Multicast uses the concept of a group to route its data. A group of receivers subscribe to a particular multicast transmission. The individual receivers of the group need not physically or geographically be located near one another. Similarly, the data can be transmitted to the group from one or more sources located virtually anywhere, as long as they can communicate with the receivers, through a common network of computers, such as the Internet. Rather than transmitting multiple copies of data packets to each receiver, as in unicast, multicast transmits one copy of its data packets to a group address. Multicast group addresses are reserved IP addresses in the range of 224.0.0.0-239.255.255.255.

The Internet comprises among other things, a network of routers that pass-along and route data. This network of routers is commonly referred to as the Internet backbone. Within the Internet backbone is a subset of multicast-enabled routers, that are programmed to handle IP multicast routing. Multicast-enabled routers are unique in that they can handle both multicasting and unicasting protocols. Multicasting is governed by its own distinct protocols. Groups of multicast-enabled routers can be connected to each other by virtual point-to-point links called tunnels. The tunnels provide passage for multicast traffic through one or more non-multicast-enabled routers, encapsulating the packets so that they appear to be normal unicast packets to the intervening router(s). The encapsulation is added at the beginning of the tunnel and removed at the end of that tunnel. In this way, a group of multicast-enabled routers can be connected to other multicast-enabled routers.

Data loss in multicasting has various sources, such as congestion in the network and Internet Service Providers (ISPs) improperly conveying multicast packets, but potentially a more significant impact then in unicasting. The distribution of routers in a multicasting session generally has a tree-like configuration with numerous branches. This is generally referred to as the multicast distribution tree. In this configuration, due to the nature of multicast when packets are lost in transit, all recipients on downstream branches from that point lose the same packet(s).

Each source in a multicast group transmits data which is associated with that source's IP address and the designated multicast group's IP address. This address pair is generally represented by the notation (S,G), where S is a source IP address and G is the group IP address. This address pair (S,G) also represents the distribution tree of routers (referred to as a "source distribution tree") from the specified source to all last hop routers (receivers) in the group. No two sources transmitting to the same multicast group should have the same (S,G) IP address pairing.

Another aspect of multicasting is that in order to maximize efficiencies, multicast-enabled routers will often designate a Rendezvous Point (RP) router within the network for a particular group. The RP routers are multicast enabled routers that form a focal point for receipt and redistribution of the data packets that are the multicast transmission for a particular multicast group. Because the data packets from all sources in the multicast group are re-transmitted from the RP, the notation (*,G) is used to represent the shared multicast distribution tree from this point (referred to as a "shared distribution tree"). The wildcard notation "*" refers to all sources for the group (G).

Members of a multicast group can join or leave at any time, so the distribution trees in multicast can be dynamic. When all the receivers on a particular branch stop requesting receipt of the multicast transmission, the multicast-enabled routers prune that branch and potentially reconfigure the distribution tree. Similarly, when new receivers request to join a group, branch additions and reconfiguration may be necessary.

An example of a simple network of multicast-enabled routers is shown in FIG. 1. The routers are each labeled with their respective router names. In this example, multicast traffic from a single source router 50 travels to RP router 10, with the path taken by the transmitted data packets indicated by dashed lines. The configuration of routers followed by the dashed lines represents a source distribution tree for this multicast group. In fact, since the source router 50 is the only source for this group, the dashed lines represent the only source distribution tree for this group. If additional sources were to join the group, the data packets from that source would be sent to the RP router 10. Once received by the RP router 10 the data packets are then redistributed to all receivers along the shared distribution tree, which is represented by the solid connector lines. In this simple network there are six active receiver routers 50, 60, 61, 62, 63, 64. The number of routers that make up a multicast network can be greater or smaller than that shown in this example. Similarly, the number of sources or receivers can vary dramatically. Further, the number of sources is independent from the number of receivers. Although, often in multicast the source routers also act as receivers in the same multicast group, as is the case in this sample multicast network shown in FIG. 1. Additionally, it should be noted that the router path from a source router 50 to RP router 10, is not necessarily reversed in order to redistribute data packets to a source router acting as a receiver router 50. This is demonstrated in FIG. 1 by the fact that the dashed lines do not follow the same exact path as the solid lines. Also, although the illustration in FIG. 1 is helpful in visualizing a multicast network, no real-time tool currently exists that provides such visualization, even in distribution tree layout, of an active multicast network.

One particular problem in multicasting is the verification of whether data has been received by all intended recipients. It is difficult to determine which routers along the transmission path received and forwarded their data as intended. As such, network administrators must wait to hear about problems from hosts or intended recipient users that report them. In other words, rather than performing proactive trouble prevention, network administrators generally troubleshoot after a problem has impacted the customer. This occurs mainly because network administrators lack effective tools for monitoring, managing and preventing data loss.

Currently, network administrators/operators manage (i.e., debug or troubleshoot) multicast routing problems by reviewing multicast routing table entries. Multicast routers maintain state information about the incoming and outgoing interfaces for each (S,G) pair, as well as the shared distribution tree (*,G). For a router, state information is used by the router to decide which packets to discard or which packets to forward and how to forward them. Generally, after hearing about a problem impacting a multicast group, operators investigate by accessing individual routers active for that group. This is a cumbersome and time consuming process that requires the administrator to login to an individual router, analyze routing table data stored in that router and then repeat this process with additional routers, if necessary. The selected router may not turn out to be the source of the problem, which will require the administrator to login to additional routers until the problem is identified. This type of troubleshooting is generally performed using a command line interface (CLI) at a user computer terminal with Internet access.

By entering specific commands, the administrator is able to login to an individual router and view network management data stored therein, such as its routing table. Using CLI, the administrator, after logging-into a specific router, can enter numerous commands, such as the "show ip mroute" command. This particular command displays the full content of the IP multicast routing table. This is useful to network administrators as it shows a great deal of information about a single router, by running a single command. However, the output from this command can potentially include thousands of routing table entries, which becomes unmanageable as a quick reference tool. In addition, the output is only a display and does not provide links to further information on related routers, such as RP, data source or neighboring routers. In order for an administrator to conduct follow-up monitoring or investigation of related routers, he or she must take note of the IP addresses of the desired router(s) and then individually login to those one at a time.

Having to manually login to each router makes it very difficult for administrators to quickly identify problems or analyze conditions across a multicast group network in real-time. In fact, the conventional method makes comparison or analysis of more than just a few network resources difficult or at least impractical in a real-time network environment. Also, it makes it difficult to envision or get an overall picture of the current active network topology in a multicast group, which would otherwise assist in monitoring that group.

The Simple Network Management Protocol (SNMP) is a well-known application layer protocol that is used to access and/or exchange management information between network devices. Network administrators use this protocol to view or access information needed to manage a network. However, SNMP is not used by network operators to view multicast router information because, in contrast to the CLI method, it does not provide a quick and simple method of compiling the extensive routing table data maintained for a router. A more detailed background on SNMP is provided in Rose, Marshall T., "The Simple Book: An Introduction to Networking Management", Prentice Hall, $2^{nd}$ Ed., 1996, which is incorporated herein by reference.

SUMMARY OF THE INVENTION

A method and system for managing multicast network traffic in accordance with some of the preferred features of the present invention includes the collection, monitoring and management of information regarding the transmission and receipt of data packets within one or more designated multicast distribution trees. The disclosed method and system provides network monitoring indicators when data packets are not received at particular multicast session routers within its multicast distribution tree. These and other features disclosed provide a tool for multicast network monitoring and/or maintenance. Additionally, active monitoring or maintenance allows administrators to act on a problem even before it is reported by a customer. Further, the invention herein provides a scalable and automated tool for monitoring, managing and preventing further data loss in a multicast network.

An object of the present invention is to provide a method and system of monitoring data packet traffic in a multicast network comprising determining a first packet count representing a quantity of data packets associated with a multicast group, transmitted from at least one source, and received by a router at a first time, determining a second packet count representing a quantity of data packets associated with the multicast group, transmitted from the at least one source, and received by the router at a second time subsequent to the first time, comparing the second packet count to the first packet count, and indicating an alarm in response to the second packet count being less than a predetermined value greater than the first packet count. This method and system can further comprise obtaining a router status for each of a plurality of routers, the router status comprising a difference between the quantity of the first and second packet counts; and indicating a warning in response to at least one of the plurality of router status being less than the predetermined value. Also such a warning can be indicated only in response to a plurality of routers status being less than the predetermined value.

A further object of the present invention is to provide a system adapted to indicate data packet traffic conditions in a multicast network comprising a graphical user interface and a processing device operatively coupled to the graphical user interface, wherein the processing device is adapted to determine a first packet count representing a quantity of data packets associated with a multicast group, transmitted from at least one source, and received by a router at a first time, determine a second packet count representing a quantity of data packets associated with the multicast group, transmitted from the at least one source, and received by the router at a second time subsequent to the first time, compare the second packet count to the first packet count, and indicate an alarm in response to the second packet count being less than a predetermined value greater than the first packet count. This system can be further adapted to obtain a router status for each of a plurality of routers, the router status comprising a difference between the quantity of the first and second packet counts, and indicate a warning in response to at least one of the plurality of router status being less than the predetermined value. As mentioned above, such a warning can be indicated only in response to a plurality of routers status being less than the predetermined value.

A further object of the present invention provides a computer-readable medium carrying at least one sequence of instructions, adapted to monitor data packet traffic in a multicast network, wherein execution of the at least one sequence of instructions by one or more processors causes the at least one sequence of instructions to perform the steps of determining a first packet count representing a quantity of data packets associated with a multicast group, transmitted from at least one source, and received by a router at a first time, determining a second packet count representing a quantity of data packets associated with the multicast group, transmitted from the at least one source, and received by the router at a second time subsequent to the first time comparing the second packet count to the first packet count, and indicating an alarm in response to the second packet count being less than a predetermined value greater than the first packet count. Execution of the at least one sequence of instructions can further cause the steps of obtaining a router status for each of a plurality of routers, the router status comprising a difference between the quantity of the first and second packet counts; and indicating a warning in response to at least one of the plurality of router status being less than the predetermined value. Also, the warning can be indicated only in response to a plurality of routers status being less than the predetermined value.

A further object of the invention is to provide a method, system or computer-readable medium, as herein mentioned, wherein the first and second packet counts are retrieved from the router using Simple Network Management Protocol (SNMP). Also the queried router can be any router in the multicast group, including a rendezvous point router or a last hop router. Further, the predetermined value associated with the alarm indication can be a value greater than zero.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 6 shows a display at a user interface representing data relating to a summary of multicast sessions selected for monitoring and the general state of those sessions grouped by status in accordance with the present invention.

DETAILED DESCRIPTION OF THE PREFERRED EMBODIMENTS

The present invention provides a method and system for managing multicast network traffic by actively monitoring whether multicast data packets are being received at routers. By retrieving packet count data from select network routers, analyzing that data and compiling and displaying the results of the analysis in a concise format, it can be used by network administrators, in real-time, as a scalable network maintenance tool. While the preferred embodiment describes proactively monitoring select multicast group transmissions, the subject invention could be applied to monitoring numerous multicast groups, with almost no limitation in the number or size of such groups.

An element of the present invention uses a customized computer software application that can be used as a network administrator tool, in accordance with the present invention. Using a programmable computer with a user interface that can access the Internet or any enterprise network, the administrator preferably initiates a 'Proactive Multicast Monitor' (ProMon) application of the subject invention. The ProMon software application was compiled using Perl, the cross platform programming language, for its rapid prototyping and portability, but other known languages could be used to obtain similar results. Additionally, a web interface, such as Ubiquity®, is preferably used and a data storage and management system is preferably used, such as MySQL®. Further, SNMP is used in the preferred embodiment for its deployability and interoperability in current telecommunications networks. It is known, however, that other programming languages, web or network interfaces, data storage/management systems and protocols could be used to emulate the results described below. However, it should be noted that while these and similar approaches can be used to execute the instant invention, they do not teach, by themselves or collectively, the method and system described herein.

Figure 1:
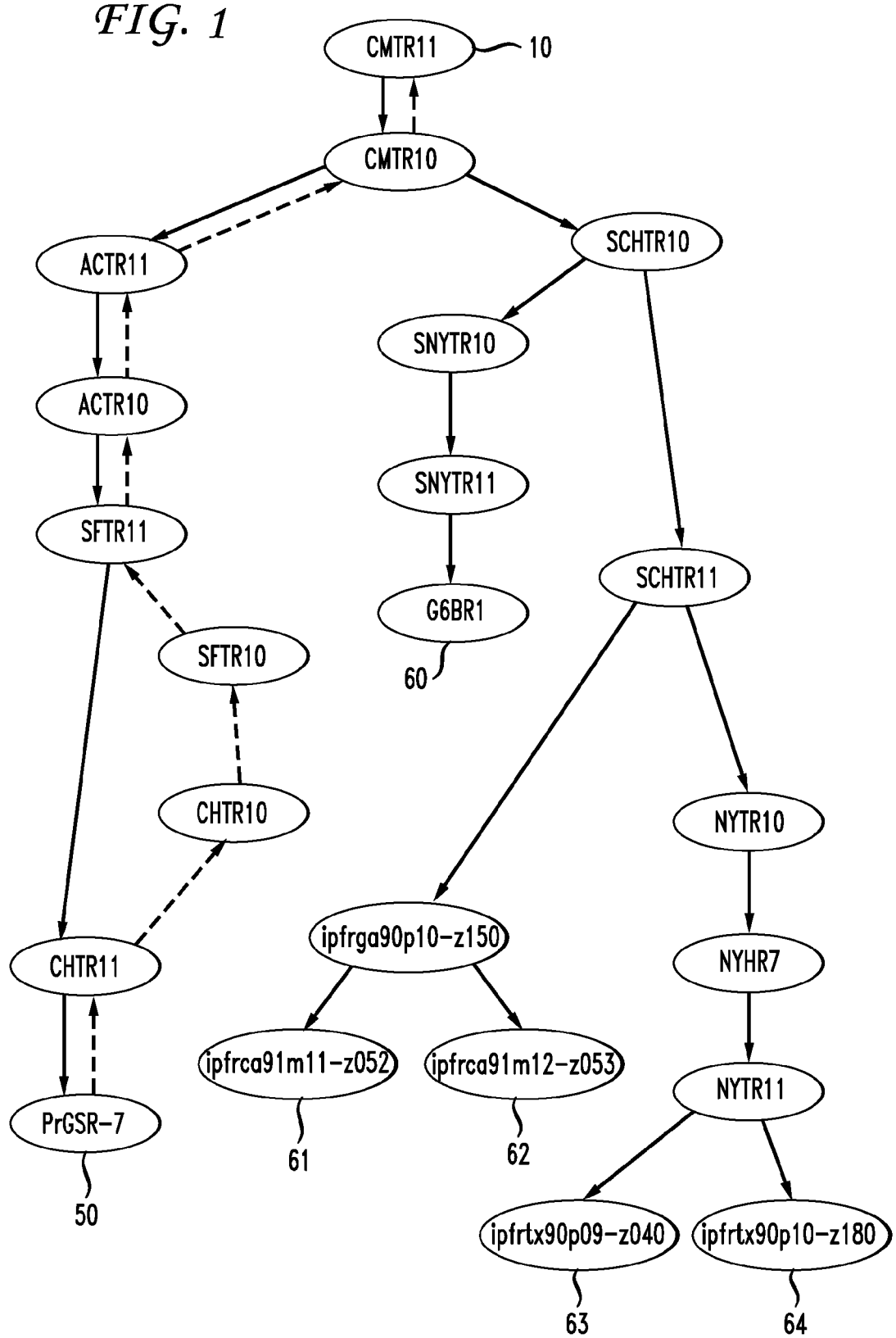
FIG. 1 shows a graphical representation of a basic multicast network.
Figure 2:
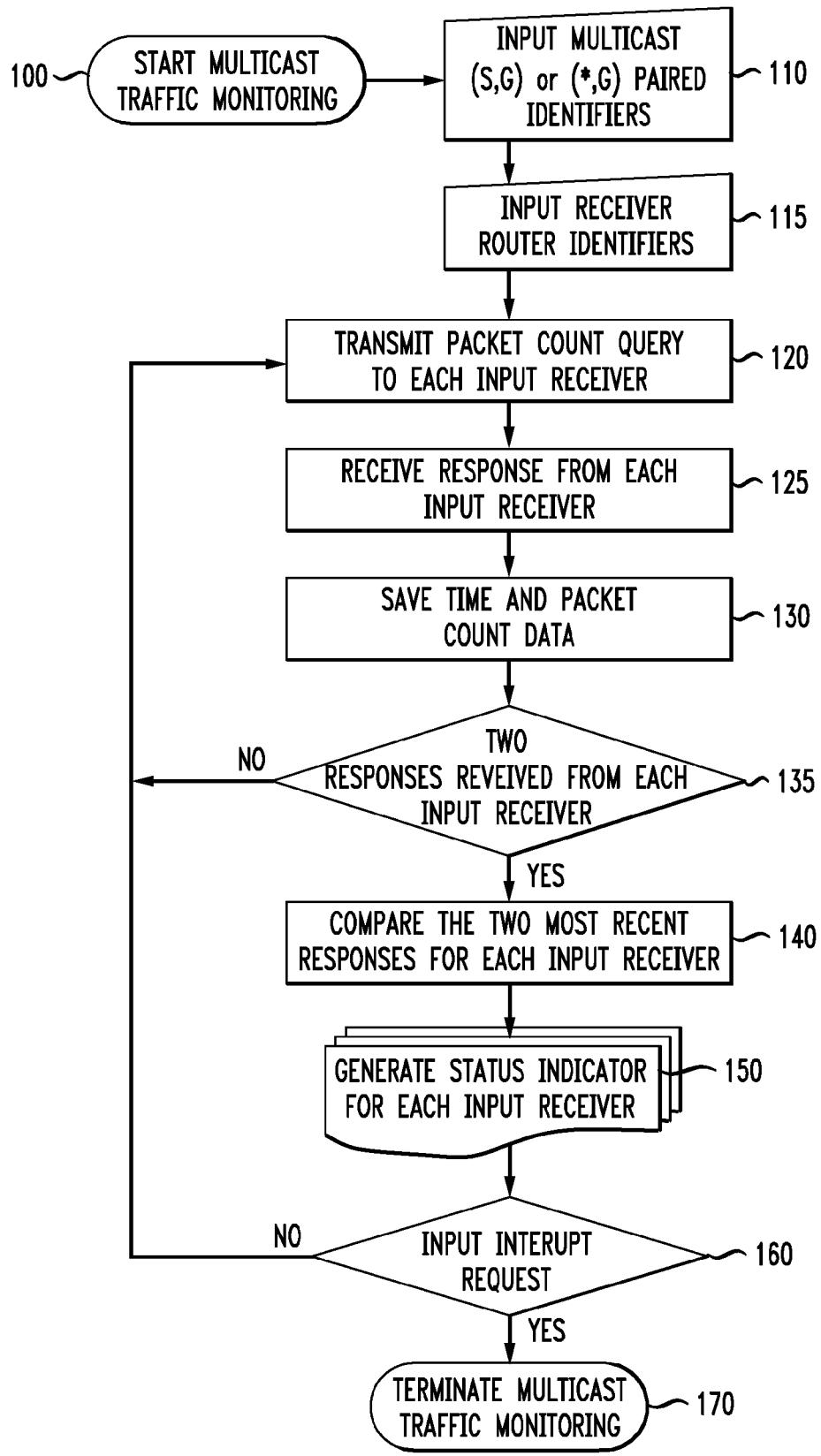
FIG. 2 shows a flow chart of a method of monitoring the receipt of multicast traffic in accordance with the present invention.

The block diagram shown in FIG. 2 outlines the method of the present invention. As the present method and system is designed as a diagnostic tool for multicast networks, the user generally begins with some knowledge about the network. In particular, network administrators and operators preferably start with identifying information for multicast source-group pairs (S,G) or (*,G) and corresponding routers to be monitored. This information will define which multicast receivers, groups and sources are selected for monitoring and/or troubleshooting.

Thus, when initiating the ProMon application in step 100 of this invention, the user preferably defines the (S,G) or (*,G) pair in step 110 and the corresponding routers in step 115 to be monitored. In the preferred embodiment of the present invention, steps 110 and 115 are performed when a user creates a configuration file that is accessible by ProMon and defines or lists identifiers for each (S,G) or (*,G) pair and their corresponding receiver routers. Below is an example of the contents of a configuration file for the present invention.

---

CONFIGURATION FILE (SAMPLE)

Group 239.129.0.3
Source 0.0.0.0
Receiver 10.0.0.81
Receiver 10.0.0.66

Group 239.129.0.3
Source 10.0.8.66
Option ANY
Receiver 10.0.0.41
Receiver 10.0.0.43

Group 239.129.0.3

CONFIGURATION FILE (SAMPLE)

```
        Source 10.0.8.81
        Option ANY
        Receiver 10.0.0.41
        Receiver 10.0.0.43
        #
        Group 239.129.0.32
        Source 0.0.0.0
        Receiver 10.0.0.81
        Receiver 10.0.0.66
        #
        Group 239.129.0.32
        Source 10.0.8.66
        Option ANY
        Receiver 10.0.0.41
        Receiver 10.0.0.43
        #
        Group 239.129.0.32
        Source 10.0.8.81
        Option ANY
        Receiver 10.0.0.41
        Receiver 10.0.0.43
        #
        Group 239.129.0.48
        Source 0.0.0.0
        Receiver 10.0.0.81
        Receiver 10.0.0.66
        Receiver 10.0.0.67
        #
        Group 239.129.0.48
        Source 10.0.8.66
        Option ANY
        Receiver 10.0.0.41
        Receiver 10.0.0.43
        #
        Group 239.129.0.48
        Source 10.0.8.67
        Option ANY
        Receiver 10.0.0.41
        Receiver 10.0.0.43
        #
        Group 239.129.0.48
        Source 10.0.8.81
        Option ANY
        Receiver 10.0.0.41
        Receiver 10.0.0.43
        #
```

ProMon preferably operates with a daemon that runs continuously, reading the configuration file, polling the routers and storing the results in a database. The multicast groups, sources and receivers are all preferably identified by their IP Address. The graphical user interface displays are preferably generated by scripts that are invoked by a web server interactively. The 'Option ANY' means it is a 'C-RP' group. Without that option, it is a (*,G) group.

In an alternative embodiment, the configuration file could identify routers by their names. Yet a further alternative embodiment would identify routers by either their names or IP addresses. Regardless of the contents of the configuration file, in the preferred embodiment of this invention, the configuration file is predefined, whether by the same user or someone else. These elements are preferably defined before the ProMon application can precede to the next step 120. It is further anticipated that the input elements for steps 110 and 115 can be setup or maintained in one or more systems or databases, accessible locally or from a remote location. In yet a further embodiment, the user interface of the present invention could be configured with input fields or a link to another application for entering one or more multicast group identifiers, source addresses, and routers to poll.

Using SNMP queries, ProMon then periodically transmits to or polls in step 120 the routers identified in step 115 to determine packet counts for each specified multicast session. The packet count indicates the number of data packets or bytes continuously received by that router from when it first became active in that particular session (defined by an (S,G) or a (*,G) pair) until the point when the routing table was last updated. In this way, over one continuously active period, a router's packet count should increase. In the preferred embodiment, the polling in step 120 occurs no more than once per minute, although this polling frequency can be adjusted. In could be set either higher or lower than once per minute. However, the highest frequency will be limited by hardware constraints and other high frequencies also will consume excess bandwidth, which will be a significant consideration. Otherwise, the polling period should be determined by the needs of the network and the applications being run thereon. During each polling cycle, a router is polled once for each session of which it is a member (as specified by configuration.) The following documents the SNMP objects requested when applying the ProMon application in accordance with the present invention:

```
        system.sysDescr 1.3.6.1.2.1.1.1 (GET)
        system.sysName 1.3.6.1.2.1.1.5 (GET)
        ipMrouteTable.ipMroutePkts 1.3.6.1.2.1.83.1.1.2.1.8 (GET)
        ipMrouteTable.ipMrouteHCOctets 1.3.6.1.2.1.83.1.1.2.1.16 (GET)
```

ProMon then receives responses in step 125 to the queries transmitted in step 120. The packet count data representing the response from each router is then stored in step 130 in a database along with a timestamp from when the data was received. The database preferably keeps track of the quantity of packet counts received for each router and the time in which they were each received. ProMon preferably needs two packet count values to compare for each input receiver (each packet count received at a different time) before proceeding to the comparison in step 140. Thus, when less then two packet counts have been saved for each receiver, the process in step 135 returns to step 120 in order to perform another round of polling. Once two packet counts are recorded for each router, the application compares the two most recent counts in step 140. Since the packet count at each router should increase over time, if the comparison in step 140 does not reveal a significant increase, it is generally considered a problem. This means the corresponding router is no longer receiving data packets.

The results from the comparison in step 140 reveal the status of each router, which is then output to a user interface in step 150. In the preferred embodiment, a comparison that determines no change in the packet count at a router will indicate an "alarm" condition. The format of the output can take the form of a simple alarm or status indicator at a graphical user interface. Also, as numerous routers from many (S,G) or (*,G) pairs can potentially be monitored simultaneously, the present invention provides a concise format for displaying the status for the many identified routers. With regard to the comparison, any threshold value can be used to indicate an alarm, such that an alarm could be indicated only if the difference between the two compared packet counts is less than a predetermined value or number. The number of packets anticipated to be received at a particular router is a function of the rate at which the source or sources are transmitting to the multicast group and the frequency of polling. For example, if a source transmits packets at rate of 1000 packets per second, and polling occurs every 10 minutes, approximately 600,000 packets should be received by the multicast group from that source. The threshold value can be a number associated with these or other anticipated values related to the transmitted packets and/or bytes. It should be noted that as transmission or link speeds increase and resulting applications continue to scale, these numbers will change accordingly. The predetermined value could be calculated as a lower bound on the number of packets transmitted by the application, based on the average sending rate of the application and the interval between successive polls. Also, the warning can be indicated in response to the status of one or more routers being less than the predetermined value.

Unless an interrupt request is input by the user in step 160, the process will return to step 120. Alternatively, if an interrupt request is received in step 160, then the application is terminated in step 170.

FIGS. 3, 4, 5 and 6 illustrate a preferred embodiment of the present invention in the form of the displays seen at a user interface These displays are generated by compiling the information contained in the underlying configuration file and the output generated in step 150 discussed above. Network administrators and operators are often required to monitor numerous multicast sessions which each include many routers. The preferred embodiment of the present invention organizes this vast amount of data to make the overall ProMon application a more effective and scalable network maintenance tool. The illustrations show a display 200 that is viewed through a traditional Internet web-browser window. The central portion of the display is divided into two primary sections, an input section 210 and an output section 250. Although this embodiment clearly delineates these two sections, in accordance with the present invention, both the input fields and the output data could be compiled and configured together in one section, divided into more sections, or organized to suit the multicast environments being monitored.

The input section 210 shown in FIGS. 3, 4, 5, and 6 provides hypertext links for the user interface to input or edit the underlying configuration file discussed above. Unlike the output section 250, the input section looks the same throughout FIGS. 3, 4, 5 and 6. It is understood that many additional input features or links can be added or incorporated along with the ones disclosed herein. However, with regard to the input section 210, the features related to the present invention are located in the area 220 labeled as "Proactive Monitoring." This area heading is a reference to the ProMon application of the present invention. The other input areas and associated text represent additional features that could be incorporated with the present invention, but are not fully discussed here. The Proactive Monitoring area 220 includes links 222, 224, and 226 that are all directed toward creating, editing, restricting or supplementing the underlying configuration file of the invention. For example, the Performance link 222 preferably allows the user to generate a summary view, as discussed below with regard to FIG. 6. The Edit Config link 224 preferably allows the user to edit the configuration file. The Display Config link 226 preferably displays the contents of the configuration file. This configuration file contains the specific IP addresses for select multicast groups, sources and routers to be monitored. However, an alternative embodiment could provide editing features to the configuration file directly from the entries in the output section 250 discussed further below.

The output section 250 shown in FIGS. 3, 4, 5, and 6 varies as each is directed toward presenting different information. The display data is compiled using SNMP queries, which allows the output to be configured, organized and displayed in a customized format. The common element of the displays in FIGS. 3, 4, 5, and 6 is that they are each organized in the format of a data table.

Figure 3:
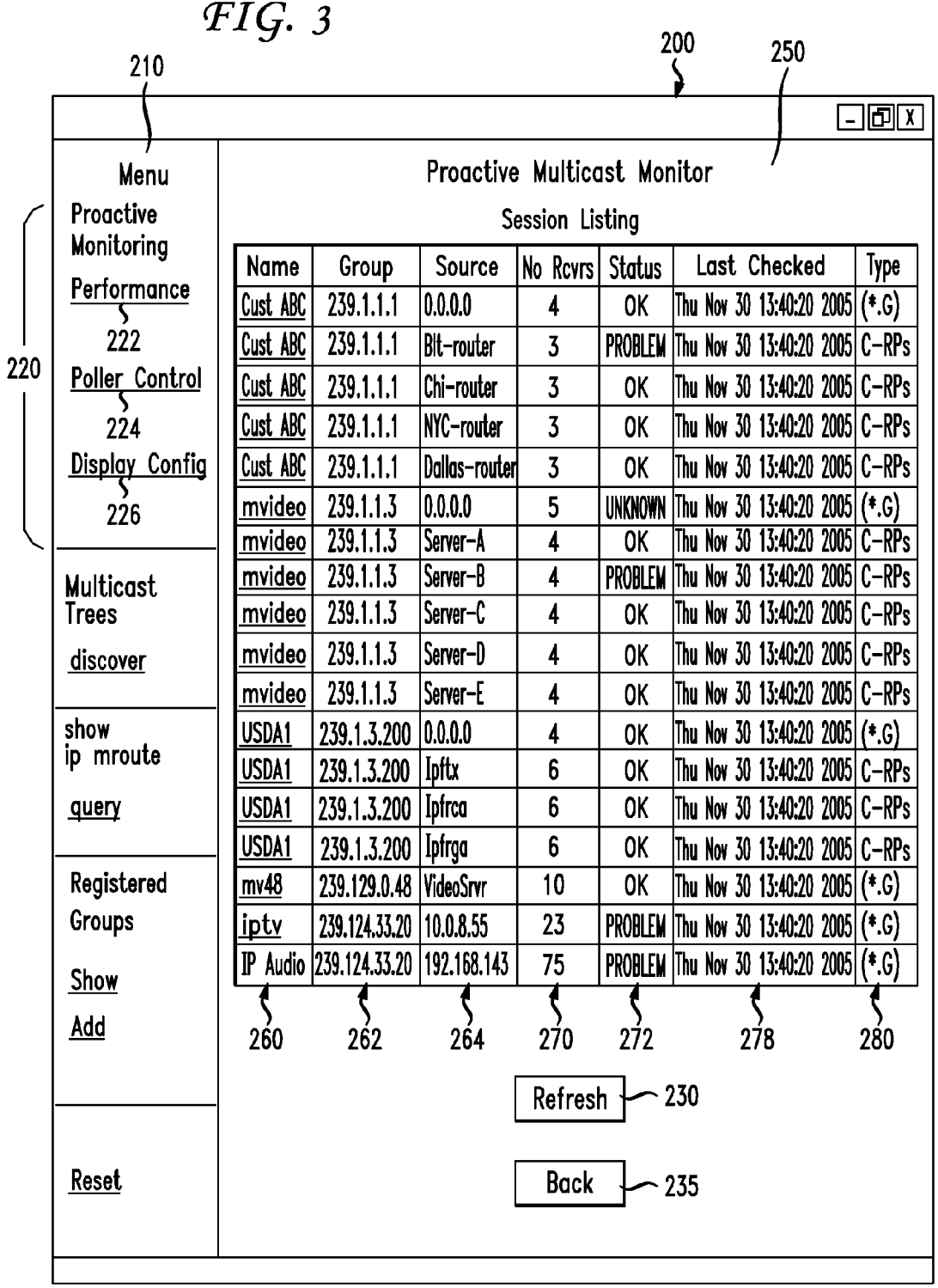
FIG. 3 shows a display at a user interface representing data relating to a plurality of specified multicast sessions being monitored in accordance with the present invention.
Figure 4:
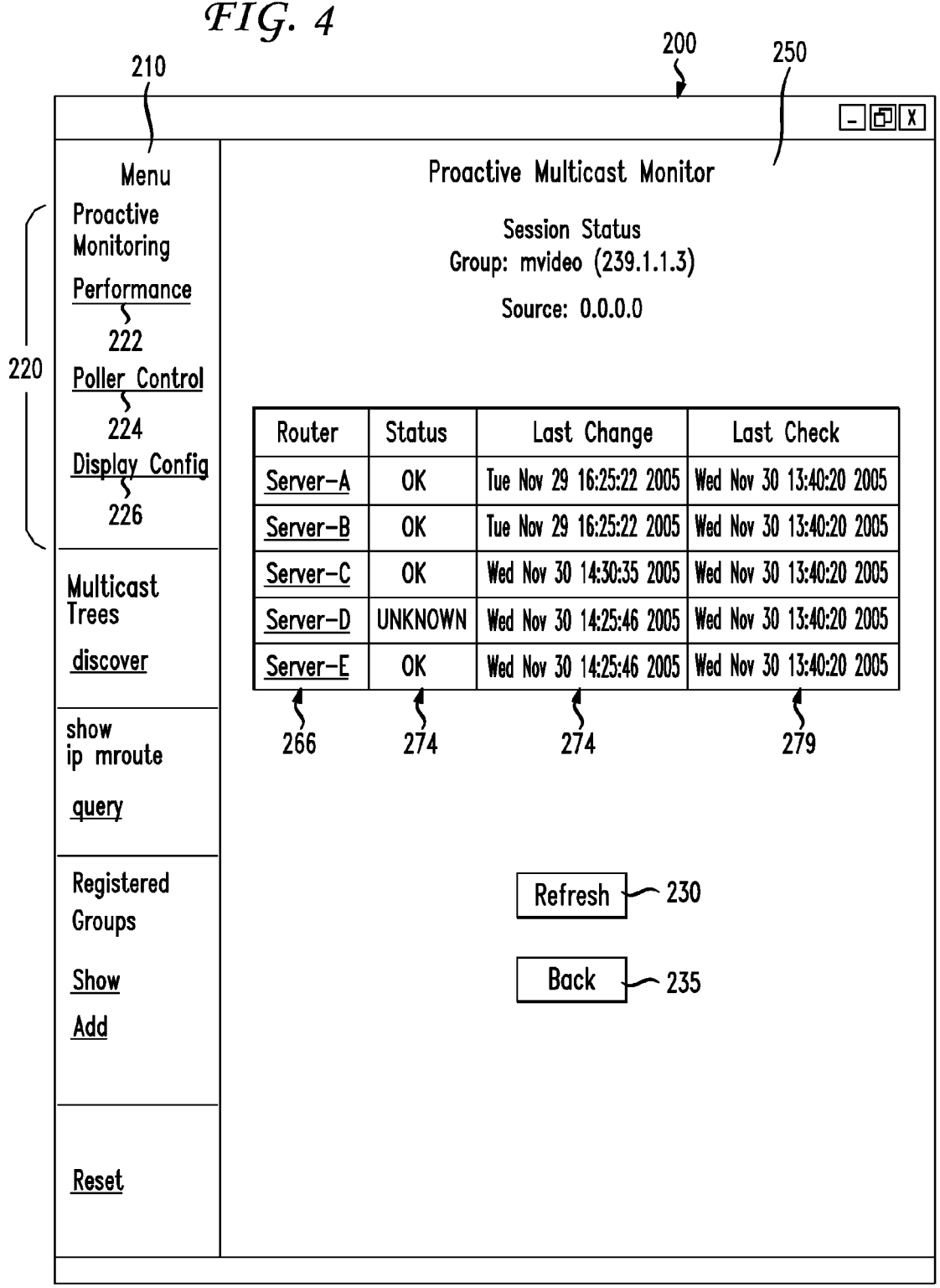
FIG. 4 shows a display at a user interface representing data relating to one of the sessions identified in FIG. 3, wherein a plurality of identified multicast receiver routers are being monitored in accordance with the present invention.
Figure 5:
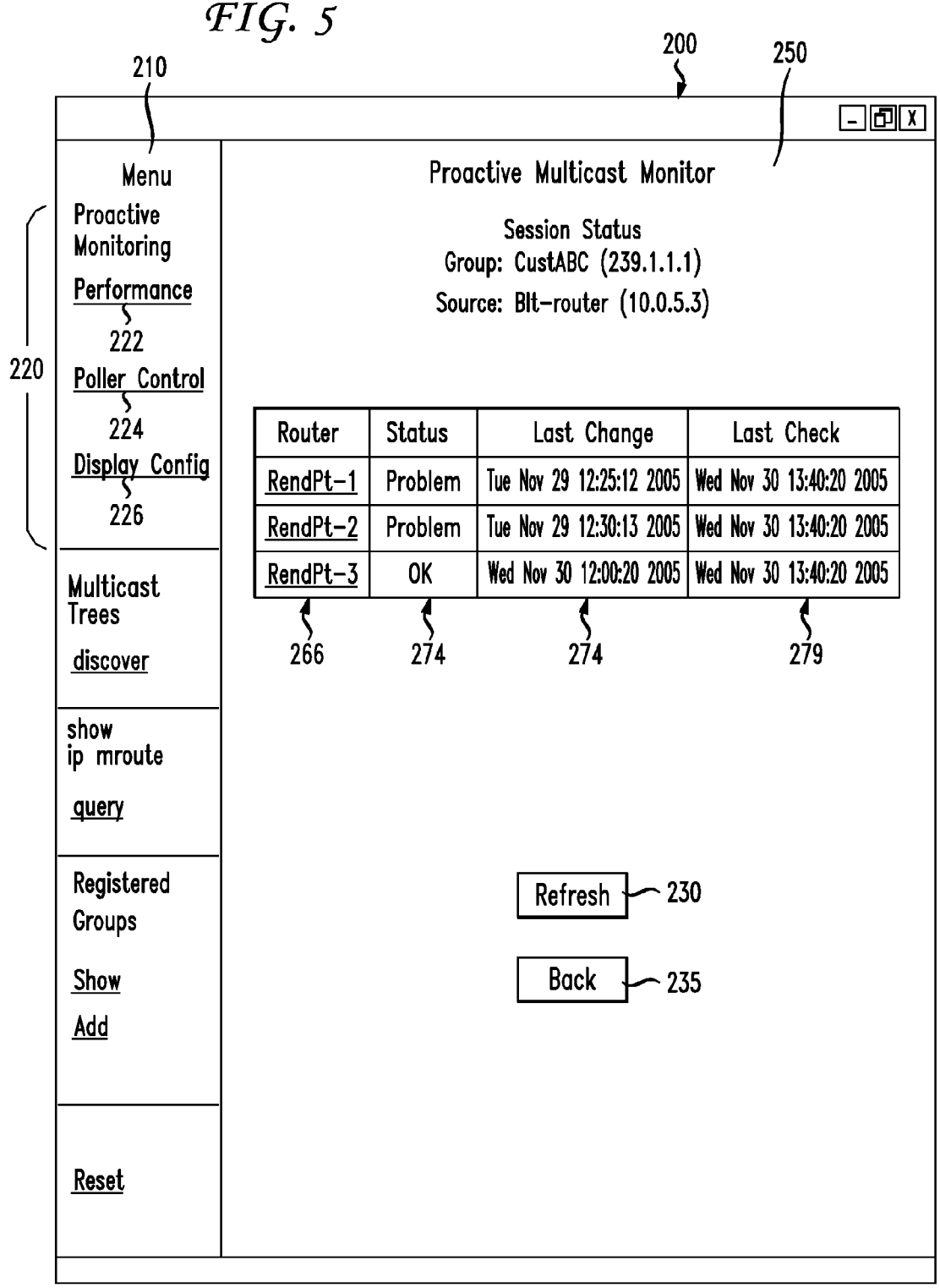
FIG. 5 shows a display at a user interface representing data relating to another one of the sessions identified in FIG. 3, wherein a plurality of candidate rendezvous point routers (C-RP's) are being monitored in accordance with the present invention.

The display shown in FIG. 3 relates to a plurality of specified multicast sessions being monitored in accordance with the present invention. Each session consists of one (S,G) or (*,G) pair that is being monitored. Thus, the information in each row of the table shown in the input section 250 of FIG. 3 is directed to a single (S,G) or (*,G) pair. The top row, however, contains headings for the table's columns. The Name column 260 displays a name associated with each group. Additionally, each displayed name is augmented with a hypertext link (generally indicated by underlined text of a different color than the primary screen text) to a screen containing more details regarding that session. Those screens are referred to herein as Session Status screen and examples are seen in FIGS. 4 and 5 and discussed further below. However, it should be noted that although the hyperlinks are located on the group names, each one is associated to only one (S,G) or (*,G) session. In other words, each group name hyperlink is associated with the row in which it is located. Once at the Session Status screen, the use of the Back button 235 can preferably return the user to the Session Listing screen.

Group names tend to be easy to remember and can remind a user of the customer, system or application being used in association with a specific multicast group. However, multicast group names are not an industry standard, and are preferably designated by an operator when configuring the software application of the current invention. In other words, group names can be entered or included in the configuration file (group names are not included in the example of a configuration file shown above). Alternatively, a central registry could be maintained for multicast group names, which could then also be accessed using SNMP commands to lookup the group names that correspond to the IP address entered in the configuration file. A further alternative would allow a user to indicate either an IP address or a group name and a database or lookup table would provide the conversion.

The Group column 262 in the Session Listing table shown in the output section 250 of FIG. 3 displays the group's IP address. This information is taken directly from the configuration file. Similarly, the Source column 264 displays the source's IP address. The No. Rcvrs column 270 displays a total for the number of receivers being monitored for a given (S,G) or (*,G) pair. The number displayed in the No. Rcvrs column 270 is compiled from the configuration file entries. The Status column 272 displays the status of the (S,G) or (*,G) pair multicast session being monitored. However, the meaning of the status that is displayed depends on the type of session (i.e., Type column) being monitored, as is discussed further below. The Last Checked column 278 shows when the data being displayed was last updated. Finally, the Type column 280 displays what type of session is being monitored.

In FIG. 3, the type column 280 preferably displays only two different types of sessions. The first is a (*,G) session and the second is a C-RPs (Candidate-Rendezvous Points) session. The (*,G) session is preferably a shared distribution tree session that monitors all the last hop or edge routers for one entire group. When a wildcard source (a code meaning all sources), such as 0.0.0.0, is indicated in the Source column 264, the session type will preferably show (*,G) in the Type column 280. However in the preferred embodiment, also considered a (*,G) session with regard to the Type column 280 are (S,G) sessions for multicast groups that do not use an RP. Thus, this exception that does not use an RP could show a non-wildcard in the Source column 264, but indicate it as a (*,G) session in the Type column 280. In contrast, the C-RPs session monitors a plurality of potential or candidate RP routers that should be capable of acting as the actual RP router for the overall group associated with that session. During any one session only one of the C-RPs will be active as the RP router. For this reason, only one of the C-RPs in a session needs to be receiving data packets for that session to be operating properly. Thus, if at least one of the C-RPs is confirmed to be actively receiving data packets the Status column 272 for that session will read "OK." In contrast, a (*,G) session requires all monitored routers to be receiving data packets. This is because if at least one end user is not receiving the multicast, something is wrong that needs to be corrected. The status of a particular router is considered "UNKNOWN" when the ProMon application is not receiving any packet count responses from its queries to that router. With regard to the Status column 272, an indicator of UNKNOWN would be displayed for a (*,G) session if any one of its monitored last hop receiver routers has an UNKNOWN status and none of its monitored last hop receivers have a "PROBLEM" status (see below). In contrast, a C-RPs session should only show an UNKNOWN status if none of the monitored routers had an OK status. The status of a particular router is considered PROBLEM if its packet counter is not advancing or if it is not maintaining a packet counter for a specified session. However, as with the UNKNOWN indicator in the Status column 272, the PROBLEM indicator in that column follows similar rules depending on the type of session being monitored. In this way an indicator of PROBLEM would be displayed for a (*,G) session if any one of its monitored last hop receiver routers has a PROBLEM status. In contrast, a C-RPs session should only show a PROBLEM status if all its monitored routers were determined to have a PROBLEM status.

The displays shown in FIGS. 4 and 5 relate to receivers being monitored for a specified multicast sessions in accordance with the present invention. In particular, FIG. 4 illustrates the Session Status display for the end receivers of a shared distribution tree session. FIG. 5 illustrates the Session Status display for a set of C-RPs associated with a particular session. Although the displays are different in FIGS. 4 and 5, they both share the same type of data. The Router column 266 preferably lists the name for each receiver router being monitored in this session. This information is derived from the underlying configuration file discussed above. If the router name is not known, then an IP address is preferably used (not shown). The Status column 274 shows the status for each receiver. This Status column 274 provides an indicator of the status of the individual router it is associated with in a common table row. In this regard, the status displayed follows the rules outlined above with regard to an individual router. The Last Change column 276 shows a time entry indicating when the status for the associated router last changed. The Last Check column 279 is similar to the column 278 shown in FIG. 4, only this one relates to an associated router, rather than the overall session.

In one embodiment of the present invention, each displayed receiver name (or IP address) shown in the Receiver column 266 is augmented with a hyperlink. These hyperlinks lead to a display that provides router state information for the router associated with that link. A more detailed disclosure of this concept is provided in a co-pending patent application, entitled "Method and System for Compiling Multicast Router Data," commonly assigned to AT&T Corp., which is incorporated herein by reference.

FIG. 6 shows a Summary table of all the sessions being monitored and listed in the Session Listing discussed above. In this regard, the Total row 290 indicates how many multicast sessions are currently being monitored by the application. The OK row 292, Problem row 294 and the Unknown row 296 each indicate how many sessions correspond to that session type. The Count column 298 refers to the number of sessions that meet each row's criteria. Finally, the Select buttons 299 allow the user to return to either a full or partial Session Listing screen. FIG. 3 is an example of a full Session Listing screen because all session are included. A partial Session Listing (not shown) would only include those sessions that match the status criteria indicated in the row headings or first column in the Summary table shown in FIG. 6. Once at the Session Listing screen a user could preferably return to the Summary screen by using the Back button 235.

One common feature seen in FIGS. 3, 4, 5 and 6 is the Refresh button 230. This feature can be provided to help update the displayed information, since the status of the many monitored routers can continually change. When the Refresh button 230 is clicked, the most recently saved packet count values will be used for the applicable comparisons and analysis, to update the display of the monitored multicast sessions.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A computer-implemented method of indicating data packet traffic conditions in a multicast network comprising:
    monitoring a number of data packets received at a packet counter associated with at least one of a plurality of routers in a multicast group;
    determining a status associated with the plurality of routers based on results of the monitoring, the plurality of routers being candidate-rendezvous points associated with the multicast group; and
    indicating the status as a problem in response to the monitored packet counter associated with the at least one of the plurality of routers failing to advance by a predetermined quantity within a predetermined interval of time, wherein the indicating is performed by a processing device operatively coupled to the multicast network.

2. The method of indicating data packet traffic conditions in a multicast network as defined by claim 1, wherein the problem is indicated in response to more than one packet counter associated with the plurality of routers failing to advance by the predetermined quantity.

3. The method of indicating data packet traffic conditions in a multicast network as defined by claim 1, wherein the plurality of routers includes a last hop router associated with the multicast group.

4. The method of indicating data packet traffic conditions in a multicast network as defined by claim 3, wherein the plurality of routers includes a rendezvous point router associated with the multicast group.

5. The method of indicating data packet traffic conditions in a multicast network as defined by claim 1, further comprising re-determining the status of the plurality of routers subsequent to the problem being indicated.

6. A system to indicate data packet traffic conditions in a multicast network comprising:
    a user interface;
    a packet counter associated with at least one of a plurality of routers in a multicast group for monitoring a number of data packets received;
    a processing device operatively coupled to the user interface and to the packet counter, the processing device determining a status associated with the plurality of routers based on results of the monitoring, the plurality of routers being candidate-rendezvous points associated with the multicast group, the user interface indicating the status as a problem in response to the packet counter associated with the at least one of the plurality of routers failing to advance by a predetermined quantity within a predetermined interval of time.

7. The system as defined by claim 6, wherein the problem is indicated in response to more than one packet counter associated with the plurality of routers failing to advance by the predetermined quantity.

8. The system as defined by claim 6, wherein the plurality of routers includes a last hop router associated with the multicast group.

9. The system as defined by claim 8, wherein the plurality of routers includes a rendezvous point router associated with the multicast group.

10. The system as defined by claim 6, wherein the processing device re-determines the status of the plurality of routers subsequent to the problem being indicated.

11. A non-transitory computer-readable storage medium storing instructions that, when executed by a processing device, cause the processing device to monitor data packet traffic in a multicast network by performing a computer process comprising:

monitoring a number of data packets received at a packet counter associated with at least one of a plurality of routers in a multicast group;

determining a status associated with the plurality of routers based on results of the monitoring, the plurality of routers being candidate-rendezvous points associated with the multicast group; and indicating the status as a problem in response to the monitored packet counter associated with the at least one of the plurality of routers failing to advance by a predetermined quantity within a predetermined interval of time.

12. The non-transitory computer-readable storage medium as defined by claim 11, wherein the computer process further comprises indicating the problem in response to more than one packet counter associated with the plurality of routers failing to advance by the predetermined quantity.

13. The non-transitory computer-readable storage medium as defined by claim 11, wherein a packet counter is associated with each router, wherein the computer process further comprises indicating the problem in response to each packet counter associated with each of the plurality of routers failing to advance by a predetermined quantity.

14. The non-transitory computer-readable storage medium as defined by claim 11, wherein the plurality of routers includes a last hop router associated with the multicast group.

15. The non-transitory computer-readable storage medium as defined by claim 14, wherein the plurality of routers includes a rendezvous point router associated with the multicast group.

16. The non-transitory computer-readable storage medium as defined by claim 11, wherein the computer process further comprises determining a further status of the plurality of routers subsequent to the problem being indicated.

* * * * *